(12) United States Patent
Wu et al.

(10) Patent No.: US 8,982,026 B2
(45) Date of Patent: Mar. 17, 2015

(54) SUB-PIXEL CIRCUIT, DISPLAY PANEL AND DRIVING METHOD THEREOF

(75) Inventors: Yu-Ching Wu, Hsin-Chu (TW);
Tien-Lun Ting, Hsin-Chu (TW);
Kun-Cheng Tien, Hsin-Chu (TW);
Chien-Huang Liao, Hsin-Chu (TW);
Wen-Hao Hsu, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 282 days.

(21) Appl. No.: 13/528,993

(22) Filed: Jun. 21, 2012

(65) Prior Publication Data

US 2013/0044090 A1 Feb. 21, 2013

(30) Foreign Application Priority Data

Aug. 17, 2011 (TW) .............................. 100129431 A

(51) Int. Cl.
*G09G 3/36* (2006.01)
*G02F 1/1362* (2006.01)
*G02F 1/1343* (2006.01)

(52) U.S. Cl.
CPC ...... *G02F 1/136213* (2013.01); *G02F 1/13624* (2013.01); *G09G 3/3607* (2013.01); *G09G 3/3659* (2013.01); *G02F 2001/134345* (2013.01); *G09G 2300/0447* (2013.01); *G09G 2300/0852* (2013.01); *G09G 2310/0216* (2013.01); *G09G 2320/0242* (2013.01)
USPC .......................................................... 345/92

(58) Field of Classification Search
CPC .... G06F 3/038; G09G 3/3659; G09G 3/3648; G09G 2300/0443; G09G 2300/0852; G09G 2300/0819; G09G 2300/0842; G09G 2300/0861; G09G 2300/0876; G09G 2300/0809; G09G 2300/0426; G09G 2310/0251; G09G 2310/0205; G09G 2320/0233; G02F 1/13624
USPC ................................................ 345/204, 87–93
See application file for complete search history.

(56) References Cited

U.S. PATENT DOCUMENTS

| 7,206,048 | B2 | 4/2007 | Song |
| 8,619,011 | B2 * | 12/2013 | Kimura ........................... 345/90 |
| 2007/0091044 | A1 * | 4/2007 | Park et al. ........................ 345/88 |
| 2008/0284931 | A1 * | 11/2008 | Kimura ........................... 349/39 |
| 2009/0027320 | A1 * | 1/2009 | Lai et al. .......................... 345/87 |
| 2009/0225018 | A1 * | 9/2009 | Kim .................................. 345/90 |
| 2009/0295703 | A1 * | 12/2009 | Hsieh et al. ...................... 345/94 |
| 2010/0220116 | A1 * | 9/2010 | Liao et al. ...................... 345/690 |

(Continued)

FOREIGN PATENT DOCUMENTS

| TW | 200905346 A | 2/2009 |
| TW | 201116911 A1 | 5/2011 |

OTHER PUBLICATIONS

Taiwan Patent Office, "Office Action", Nov. 22, 2013.

*Primary Examiner* — Liliana Cerullo
(74) *Attorney, Agent, or Firm* — WPAT, PC; Justin King

(57) ABSTRACT

A sub-pixel circuit, display panel and driving method of the display panel are provided. The display panel has a plurality of data lines, scan lines and sub-pixel circuits. At least one of the sub-pixel circuits is electrically coupled to one data line and three scan lines. The sub-pixel circuit determines whether to receive data from the coupled data line or not according to scan signals transmitted on the coupled three scan lines, and controls transmittance itself accordingly. Specifically, the scan signals transmitted on the coupled three scan lines are different from each other.

13 Claims, 8 Drawing Sheets

(56) References Cited

U.S. PATENT DOCUMENTS

2011/0115998 A1 5/2011 Liao et al.
2011/0193842 A1* 8/2011 Tsai et al. .................... 345/209
2011/0205461 A1* 8/2011 Chen et al. .................... 349/38
2012/0274623 A1* 11/2012 Do et al. ....................... 345/212
2012/0326950 A1* 12/2012 Park et al. ..................... 345/55

* cited by examiner

SUB-PIXEL CIRCUIT, DISPLAY PANEL AND DRIVING METHOD THEREOF

TECHNICAL FIELD

The present invention relates to a pixel circuit and a display panel using the same, and more particularly to a pixel circuit with lower color washout phenomenon and a display panel using the same.

BACKGROUND

Nowadays, liquid crystal display (LCD) is one kind of flat panel display widely used. According to a driving manner, LCD may be roughly classified as three types including a Twisted Nematic (TN) mode LCD, a Vertical Alignment (VA) mode LCD and an In Plane Switching (IPS) mode LCD.

TN mode LCD is the earliest developed LCD and its advantage is to have low cost and quick response. TN mode LCD, however, has a narrow viewing angle. On the contrary, VA mode LCD and IPS mode LCD provide a wider viewing angle so that they are better driving manner for large display devices.

Although VA mode LCD has a wider viewing angle, there exists the color washout problem. For solving this problem, a pixel circuit is divided into two sub-pixels, and pixel voltages of the two sub-pixels are different such that different brightness is generated. However, the brightness can only be restrained near gamma 2.2 curve in a certain range of gray level as shown in FIG. 1. It is not good enough, so that study for solving color washout phenomenon keeps going.

SUMMARY

The present disclosure provides a sub-pixel circuit which is electrically coupled to a data line. The sub-pixel circuit comprises a first sub-electrode control circuit, a second sub-electrode control circuit, and a third electrode control circuit. The first sub-electrode control circuit is electrically coupled to the data line, and is controlled by a first scan signal for determining the transmittance of a first block. The second sub-electrode control circuit is electrically coupled to the data line, and is controlled by the first scan signal and a second scan signal for determining the transmittance of a second block. The third sub-electrode control circuit is electrically coupled to the data line, and is controlled by the first scan signal and a third scan signal for determining the transmittance of a third block. Moreover, the first, the second and the third scan signals are different from each other.

The present disclosure further provides a display panel, which comprises a plurality of data lines, a plurality of scan lines, a plurality of blocks, and a plurality of sub-pixel circuits. At least one of the sub-pixel circuits controls some of the blocks, and is electrically coupled to one of the data lines and to three scan lines to determine whether to receive data transmitted by the electrically coupled data line and controls the transmittance of the controlled blocks based on the scan signals transmitted by the three scan lines, wherein the scan signals transmitted by the three scan lines are different from each other.

The present invention further provides a driving method of a display panel, which comprises two adjacent first sub-pixel circuit and second sub-pixel circuit arranged in a first direction as described above. The driving method is characterized in that when serially drives the first and second sub-pixel circuits, only one of the first and second sub-pixel circuits is driven in the beginning, and then, the first and second sub-pixel circuits are simultaneously driven, after driving one of the first and second sub-pixel circuits for three times from the beginning, further only driving the other one of the first and second sub-pixel circuits.

BRIEF DESCRIPTION OF THE DRAWINGS

The present disclosure will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. The following descriptions of preferred embodiments of this invention are presented herein for purpose of illustration and description only. It is not intended to be exhaustive or to be limited to the precise form disclosed.

Figure 1:
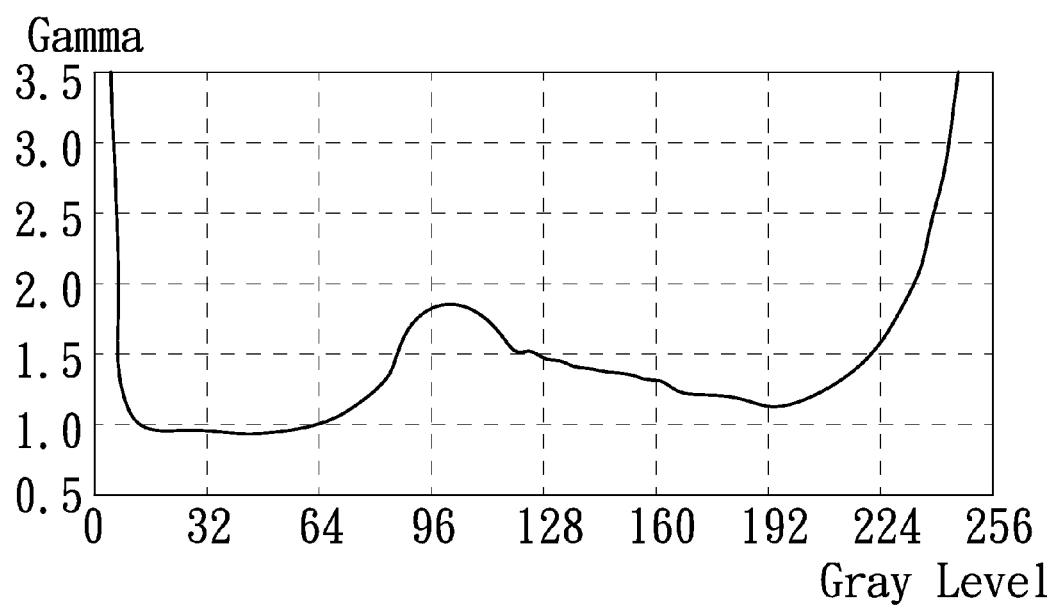
FIG. 1 is a curve diagram showing the gray brightness of a 45 angle obtained after employing an existed side-view color washout technique.
Figure 2A:
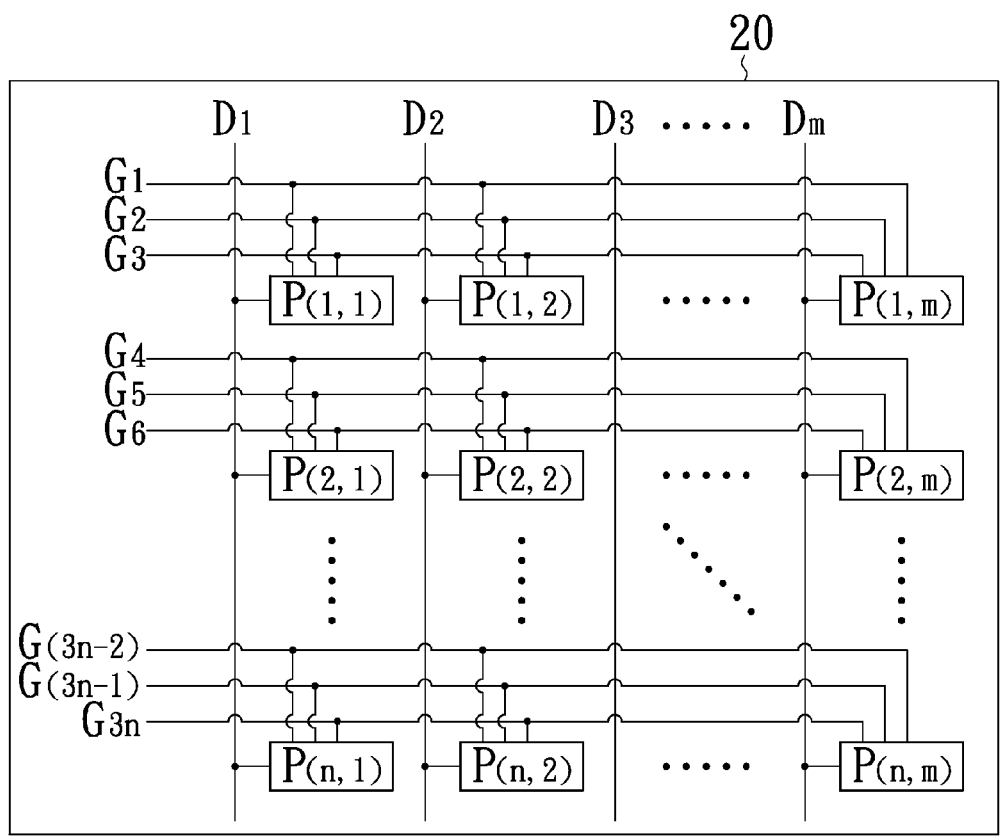
FIG. 2A is a block diagram of the display panel according to one embodiment of the present invention.

Referring to FIG. 2A, which illustrates a block diagram of a display panel according to one embodiment of the present invention. In the present embodiment, the display panel 20 includes a plurality of scan lines $G_1, G_2, G_3 \ldots G_{3n}, G_{3n-1}$, and $G_{3n}$, a plurality of data lines $D_1, D_2, D_3 \ldots$, and $D_m$, and a plurality of sub-pixel circuits $P_{(1,1)}, P_{(1,2)} \ldots$ and $P_{(n,m)}$, wherein the sub-pixel circuit located at the $X^{th}$ row and the $Y^{th}$ column is denoted as $P_{(x,y)}$. For example, the sub-pixel circuit located at the $1^{st}$ row is respectively denoted as $P_{(1,1)}$, $P_{(1,2)} \ldots$ and $P_{(1,m)}$, the sub-pixel circuits located at the $n^{th}$ row is respectively denoted as $P_{(n,1)}, P_{(n,2)} \ldots$ and $P_{(n,m)}$, the sub-pixel circuits located at the $1^{st}$ column is respectively denoted as $P_{(n,1)}, P_{(n,2)} \ldots$ and $P_{(n,m)}$, the sub-pixel circuits located at the $2^{nd}$ column is respectively denoted as $P_{(1,2)}$, $P_{(2,2)} \ldots$ and $P_{(n,2)}$, and the sub-pixel circuits located at the $m^{th}$ column is respectively denoted as $P_{(1,m)}, P_{(2,m)} \ldots$ and $P_{(n,m)}$.

As shown in FIG. 2A, one sub-pixel circuit is electrically coupled to three scan lines and one data line. Accordingly, the sub-pixel circuit is controlled by scan signals transmitted on the coupled scan lines for receiving data from the coupled data line and for further controlling transmittance of the sub-pixel circuit itself. For example, the sub-pixel circuit $P_{(1,1)}$ is electrically coupled to the data line $D_1$ and to the scan lines $G_1, G_2$ and $G_3$. Hence, the scan signals transmitted by the scan lines $G_1, G_2$ and $G_3$ determines whether the sub-pixel circuit $P_{(1,1)}$ receives the data transmitted by the data line $D_1$ and further determines the transmittance of the sub-pixel circuit $P_{(1,1)}$. The operations performed in the sub-pixel according to the electrically coupled scan lines and data line is going to be explained in detail as below accompany with FIG. 2B and FIG. 3.

Figure 2B:
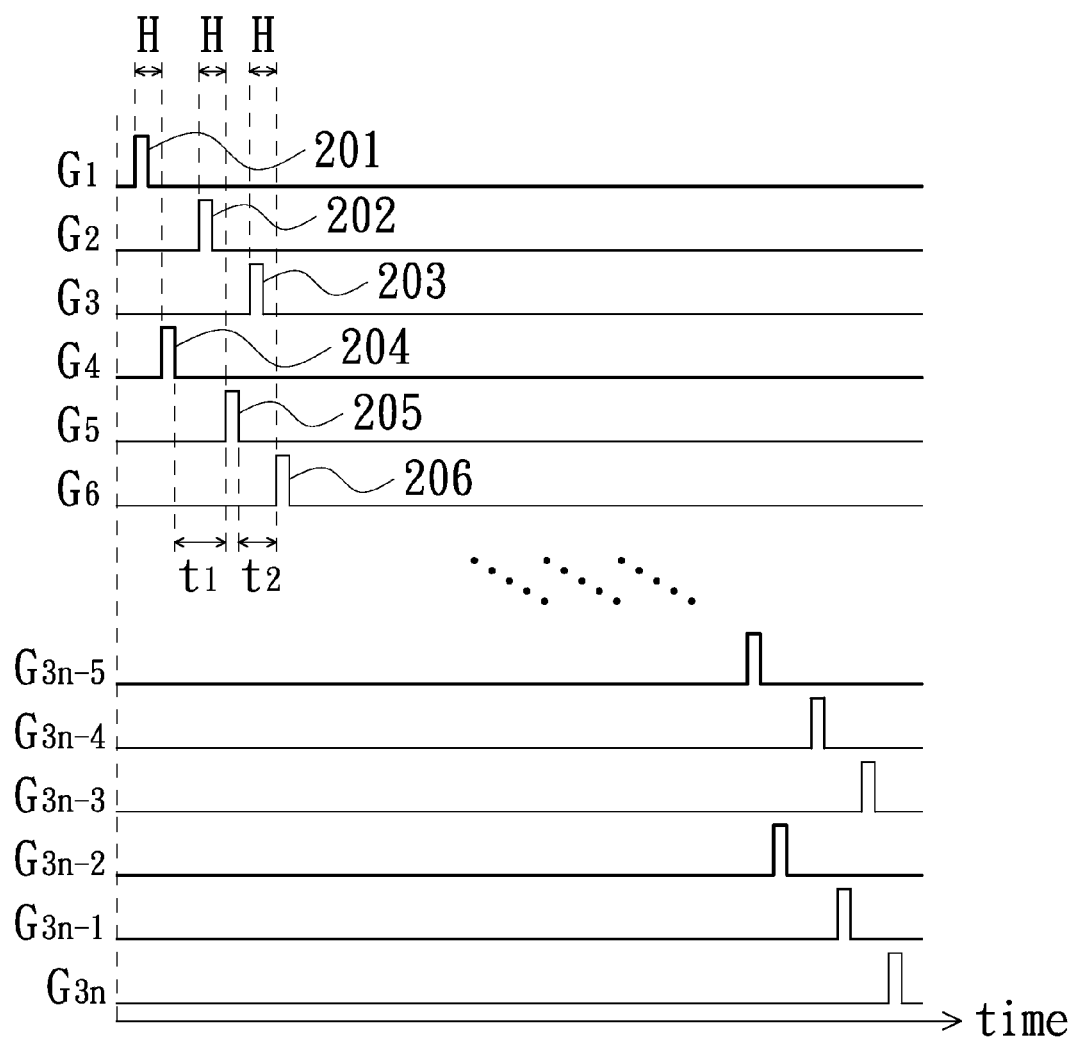
FIG. 2B is a timing diagram of the scan signals transmitted on the scan lines of the display panel according to FIG. 2A.
Figure 3:
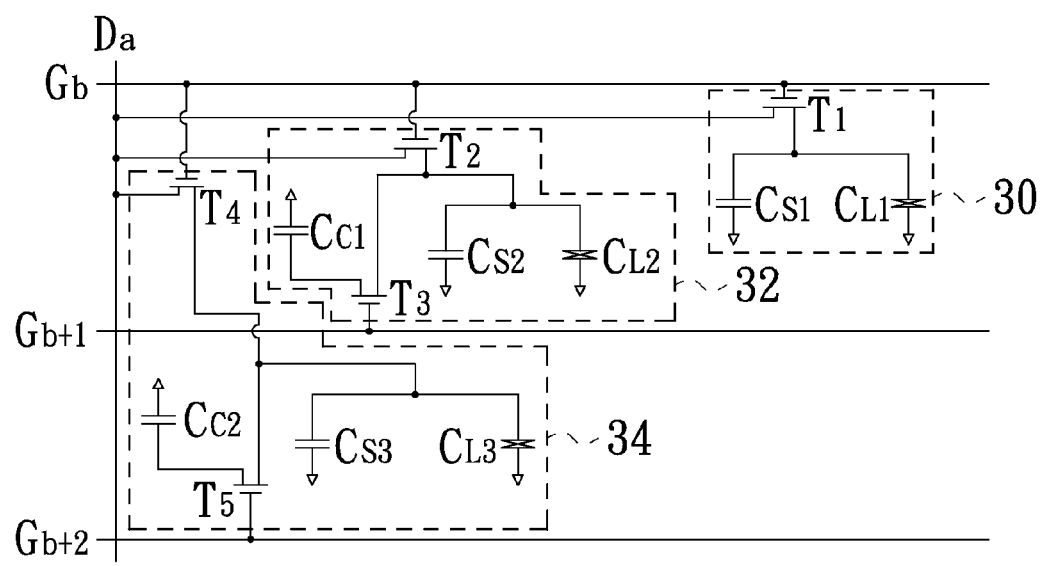
FIG. 3 is an equivalent circuit diagram of a sub-pixel circuit according to one embodiment of the present invention.

Refer to FIG. 2B and FIG. 3, wherein a timing diagram of the scan signals transmitted on the scan lines of the display panel according to FIG. 2A is shown in FIG. 2B, and an equivalent circuit of a sub-pixel circuit according to one embodiment of the present invention is shown in FIG. 3. In the embodiment shown in FIG. 3, the sub-pixel circuit includes three sub-electrode control circuits 30, 32 and 34, and each of the sub-electrode control circuits controls the transmittance of a corresponding block. The sub-electrode control circuit 30, which is electrically coupled to a data line $D_a$ and a scan line $G_b$, such as scan line $G_1$, is for controlling the transmittance of a corresponded block based upon a scan signal transmitted by the scan line $G_b$, such as the pulse 201 transmitted by the scan line $G_1$. The sub-electrode control circuit 32, which is electrically coupled to the data line $D_a$ and the scan lines $G_b$ and $G_{b+1}$, such as the scan lines $G_1$ and $G_2$, is for controlling the transmittance of a corresponded block based upon scan signals transmitted by the scan lines $G_b$ and $G_{b+1}$, such as the pulses 201 and 202 transmitted by the scan lines $G_1$ and $G_2$. The sub-electrode control circuit 34, which is electrically coupled to the data line $D_a$ and the scan lines $G_b$ and $G_{b+2}$, such as the scan lines $G_1$ and $G_3$, is for controlling the transmittance of a corresponded block based upon scan signals transmitted by the scan lines $G_b$ and $G_{b+2}$, such as the pulses 201 and 203 transmitted by the scan lines $G_1$ and $G_3$.

In detail, the sub-electrode control circuit 30 mainly includes a transistor $T_1$, a storage capacitor $C_{S1}$, and a liquid capacitor $C_{L1}$. The liquid capacitor $C_{L1}$ indicates an equivalent capacitance effect caused by the liquid molecules chipped between a positive panel and a negative panel. Because the transistor $T_1$ is electrically coupled to one of the electrodes (hereinafter a first sub-electrode), the transistor $T_1$ is so called as being electrically coupled to the liquid capacitor $C_{L1}$. According to FIG. 3, the transistor $T_1$ is further electrically coupled between the data line $D_a$ and the storage capacitor $C_{s1}$, and a scan signal (hereinafter a first scan signal) transmitted by the scan line $G_b$ is used for controlling whether the transistor $T_1$ is turned on. Due to the transistor $T_1$ being also electrically coupled to the liquid capacitor $C_{L1}$, once the transistor $T_1$ is turned on, the data transmitted by the data line $D_a$ (namely, the voltage potential of the data line $D_a$) is transmitted to the storage capacitor $C_{S1}$ and the liquid capacitor $C_{L1}$, and is stored within the storage capacitor $C_{S1}$ and the liquid capacitor $C_{L1}$.

The second sub-electrode control circuit 32 includes a transistor $T_2$, a transistor $T_3$, a storage capacitor $C_{S2}$, a liquid capacitor $C_{L2}$ and a charge sharing capacitor $Cc_1$. Likewise, the liquid capacitor $C_{L2}$ indicates an equivalent capacitance effect caused by the liquid molecules chipped between a positive panel and a negative panel. Because the transistor $T_2$ is electrically coupled to one of the electrodes (hereinafter a second sub-electrode), the transistor $T_2$ is so called as being electrically coupled to the liquid capacitor $C_{L2}$. According to FIG. 3, the transistor $T_2$ is further electrically coupled between the data line $D_a$ and the storage capacitor $C_{S2}$, and the first scan signal transmitted by the scan line $G_b$ is used for controlling whether the transistor $T_2$ is turned on. Due to the transistor $T_2$ being also electrically coupled to the liquid capacitor $C_{L2}$, once the transistor $T_2$ is turned on, the data transmitted by the data line $D_a$ (namely, voltage the potential of the data line $D_a$) is transmitted to the storage capacitor $C_{S2}$ and the liquid capacitor $C_{L2}$, and is stored within the storage capacitor $C_{S2}$ and the liquid capacitor $C_{L2}$.

The transistor $T_3$ is electrically coupled between the storage capacitor $C_{S2}$ and the charge sharing capacitor $C_{C1}$. Furthermore, the transistor $T_3$ is electrically coupled to the scan line $G_{b+1}$. Accordingly, the scan signal (hereinafter a second scan signal) transmitted by the scan line $G_{b+1}$ is used for controlling whether the transistor $T_3$ is turned on. In addition, the transistor $T_3$ is also electrically coupled between the charge sharing capacitor $C_{C1}$ and the liquid capacitor $C_{L2}$, that is, a terminal of the transistor $T_3$ is electrically coupled to the second sub-electrode. Therefore, once the transistor $T_3$ is turned on, the storage capacitor $C_{S2}$, the liquid capacitor $C_{L2}$ and the charge sharing capacitor $C_{C1}$ could share charges each other, and the voltage potential of the storage capacitor $C_{S2}$ and the liquid capacitor $C_{L2}$ may be changed.

The third sub-electrode control circuit 34 includes a transistor $T_4$, a transistor $T_5$, a storage capacitor $C_{S3}$, a liquid capacitor $C_{L3}$ and a charge sharing capacitor $Cc_2$. Likewise, the liquid capacitor $C_{L3}$ indicates an equivalent capacitance effect caused by the liquid molecules chipped between a positive panel and a negative panel. Because the transistor $T_4$ is electrically coupled to one of the electrodes (hereinafter a third sub-electrode), the transistor $T_4$ is so called as being electrically coupled to the liquid capacitor $C_{L3}$. In FIG. 3, the transistor $T_4$ is electrically coupled between the data line $D_a$ and the storage capacitor $C_{S3}$, and the first scan signal transmitted by the scan line $G_b$ is used for controlling whether the transistor $T_4$ is turned on. Due to the transistor $T_4$ being electrically coupled to the liquid capacitor $C_{L3}$, once the transistor $T_4$ is turned on, the data transmitted by the data line $D_a$ (namely, the voltage potential of the data line $D_a$) is transmitted to the storage capacitor $C_{S3}$ and the liquid capacitor $C_{L3}$ and is stored within the storage capacitor $C_{S3}$ and the liquid capacitor $C_{L3}$.

The transistor $T_5$ is electrically coupled between the storage capacitor $C_{S3}$ and the charge sharing capacitor $C_{C2}$. Furthermore, the transistor $T_5$ is electrically coupled to the scan line $G_{b+2}$. Accordingly, the scan signal (hereinafter a third scan signal) transmitted by the scan line $G_{b+2}$ is used for controlling whether the transistor $T_5$ is turned on. In addition, the transistor $T_5$ is also electrically coupled between the charge sharing capacitor $C_{C2}$ and the liquid capacitor $C_{L3}$, that is, a terminal of the transistor $T_5$ is electrically coupled to the third sub-electrode. Therefore, once the transistor $T_5$ is turned on, the storage capacitor $C_{S3}$, the liquid capacitor $C_{L3}$ and the charge sharing capacitor $C_{C2}$ could share charges each other, and the voltage potential of the storage capacitor $C_{S3}$ and the liquid capacitor $C_{L3}$ may be changed.

Those transistors $T_1$~$T_5$ are used for turning on/off conducting paths so the skilled persons in the art can use a preferable switch component to replace the transistors $T_1$~$T_5$ without affecting the result achieved in the embodiment.

Figure 4:
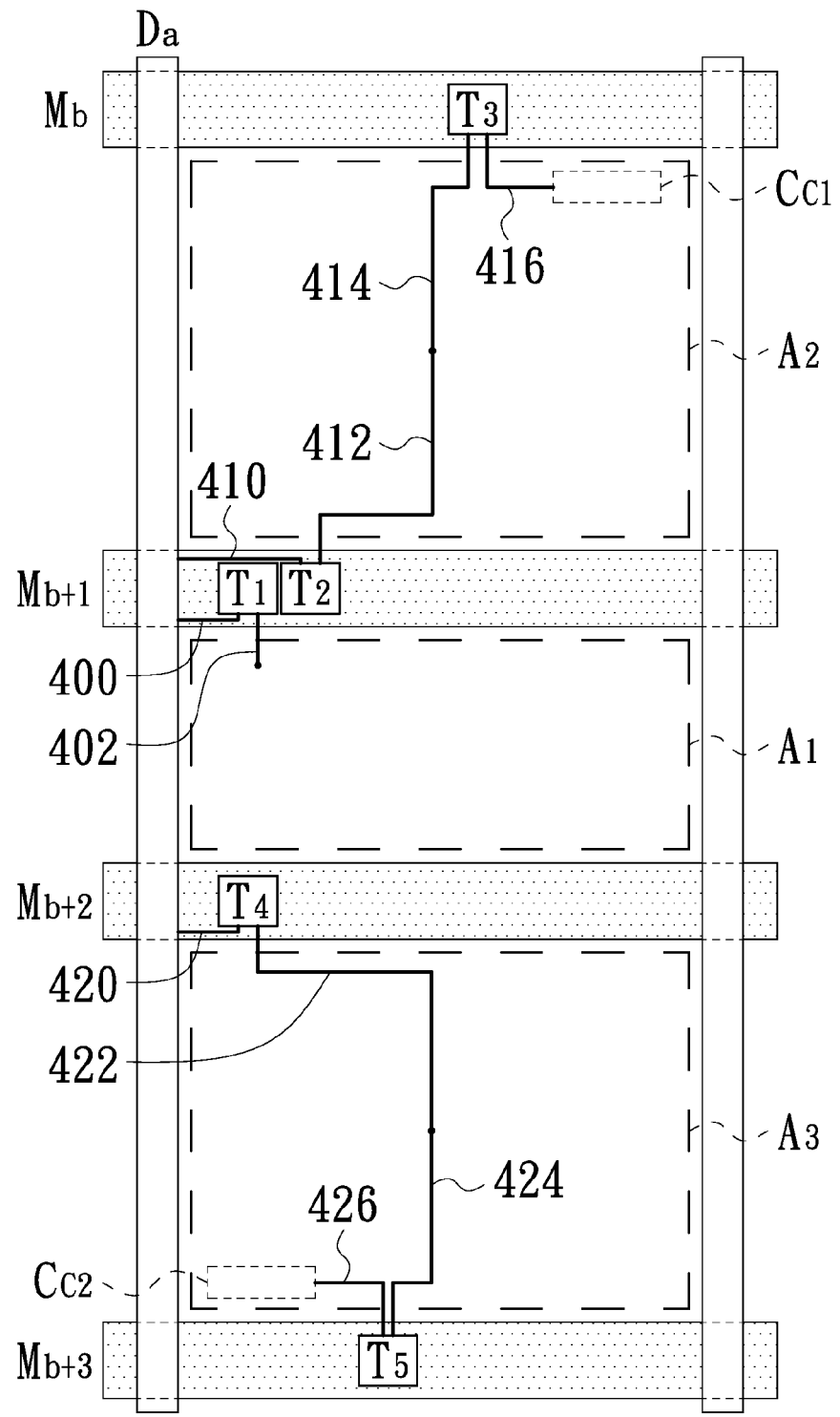
FIG. 4 is a schematic diagram of one embodiment of the sub-pixel circuit in FIG. 3.

Referring to FIG. 4, a schematic diagram of one embodiment used in the sub-pixel circuit in FIG. 3 is shown. As shown in FIG. 4, the sub-pixel circuit in the present embodiment includes three blocks $A_1$, $A_2$ and $A_3$, a plurality of charge capacitors $C_{C1}$ and $C_{C2}$, a plurality of transistors $T_1$, $T_2$, $T_3$, $T_4$ and $T_5$, and a plurality of conducting lines $M_b$, $M_{b+1}$, $M_{b+2}$ and $M_{b+3}$. Wherein, the sub-pixel circuit is electrically coupled to the data line $D_a$, the conducting line $M_b$ is electrically coupled to the scan line $G_{b+1}$ in FIG. 3, the conducting lines $M_{b+1}$ and $M_{b+2}$ are electrically coupled to the scan line $G_b$ in FIG. 3, and the conducting line $M_{b+3}$ is electrically coupled to the scan line $G_{b+2}$ in FIG. 3. Since the scan lines $G_b$, $G_{b+1}$ and $G_{b+2}$ respectively transmits the first, the second and the third scan signal, the conducting line $M_b$ transmits the second scan signal for controlling whether the transistor $T_3$ is turned on, the conducting lines $M_{b+1}$ and $M_{b+2}$ transmit the first scan signal for respectively controlling whether the transistor $T_1$, $T_2$, and $T_4$ is turned on, and the conducting line $M_{b+3}$ transmits the third scan signal for controlling whether the transistor $T_5$ is turned on.

As shown in FIG. 4, the second block $A_2$ and the third block $A_3$ are disposed on the two opposite sides of the first block $A_1$. The conducting line $M_{b+1}$ transmitting the first scan signal is disposed between the first block $A_1$ and the second block $A_2$, and the conducting line $M_{b+2}$ transmitting the first scan signal is disposed between the first block $A_1$ and the third block $A_3$. The conducting line $M_b$ for transmitting the second scan signal and the conducting lines $M_{b+1}$ and $M_{b+2}$ for transmitting the first scan signal are disposed on the two opposite sides of the second block $A_2$, and the conducting line $M_{b+3}$ for transmitting the third scan signal and the conducting lines $M_{b+1}$ and $M_{b+2}$ for transmitting the first scan signal are disposed on the two opposite sides of the third block $A_3$.

The embodiment shown in FIG. 4 defines the first sub-electrode control circuit 30 shown in FIG. 3 as including the transistor $T_1$ and the conducting lines 400 and 402. The transistor $T_1$ is electrically coupled to the data line $D_a$ through the conducting line 400 and is controlled by the first scan signal transmitted by the conducting line $M_{b+1}$ for determining whether to receive the data transmitted by the data line $D_a$. The data received by the transistor $T_1$ is conducted into the first sub-electrode control circuit through the conducting line 402, and is stored in the first sub-electrode control circuit (in general, stored into the capacitor designed inside block $A_1$ or near the boundary of the block $A_1$, namely, in the storage capacitor $C_{s1}$ in FIG. 3, not shown in FIG. 4). The voltage potential stored in the first sub-electrode control circuit indicates the data stored in the first sub-electrode control circuit. The transmittance of the block $A_1$ is affected by the potential difference between the potential of the stored data and a common potential. In another aspect, due to the common potential being a fixed value in a certain period, the transmittance of the first block $A_1$ of the first sub-electrode control circuit is determined by the received data of the first block $A_1$.

The embodiment shown in FIG. 4 defines the second sub-electrode control circuit 32 shown in FIG. 3 as including the transistors $T_2$ and $T_3$, the charge sharing capacitor $Cc_1$, and the conducting lines 410, 412, 414 and 416. The transistor $T_2$ is electrically coupled to the data line $D_a$ through the conducting line 410 and is controlled by the first scan signal transmitted by the conducting line $M_{b+1}$ for determining whether to receive the data transmitted by the data line $D_a$. The data received by the transistor $T_2$ is conducted into the second sub-electrode control circuit through the conducting line 412, and is stored in the second sub-electrode control circuit (in general, stored into the capacitor designed in block $A_2$ or near the boundary of the block $A_2$, namely, in the storage capacitor $C_{s2}$ in FIG. 3, not shown in FIG. 4). Besides, the second scan signal transmitted by the conducting line $M_b$ controls whether the transistor $T_3$ is turned on. Once the transistor $T_3$ is turned on, the voltage potential of the data stored in the second sub-electrode circuit may be changed because of charge sharing with the charge sharing capacitor $C_{C1}$ through the conducting lines 414 and 416.

The transmittance of the block $A_3$ is controlled by the second sub-electrode control circuit based on the voltage potential of the stored data. However, the so-called "stored data" may be different at different time, such as the data just received from the data line $D_a$, and the data stored in the second sub-electrode control circuit after charge sharing.

The embodiment shown in FIG. 4 further defines the third sub-electrode control circuit 34 shown in FIG. 3 as including the transistors $T_4$ and $T_5$, the charge sharing capacitor $C_{c2}$, and the conducting lines 420, 422, 424 and 426. The transistor $T_4$ is electrically coupled to the data line $D_a$ through the conducting line 420 and is controlled by the first scan signal transmitted by the conducting line $M_{b+2}$ for determining whether to receive the data transmitted by the data line $D_a$. The data received by the transistor $T_4$ is conducted into the third sub-electrode control circuit through the conducting line 422 and is stored in the third sub-electrode control circuit (in general, stored into the capacitor designed in block $A_3$ or near the boundary of block $A_3$, namely, in the storage capacitor $C_{s3}$ in FIG. 3, not shown in FIG. 4). Besides, the second scan signal transmitted by the conducting line $M_{b+3}$ controls whether the transistor $T_5$ is turned on. Once the transistor $T_5$ is turned on, the voltage potential of the data stored in the third sub-electrode circuit may be changed because of charge sharing with the charge sharing capacitor $C_{C2}$ through the conducting lines 424 and 426.

Similarly, the transmittance of the block $A_3$ is controlled by the third sub-electrode control circuit based on the voltage potential of the stored data. However, the so-called "stored data" may be different at different time, such as the data just received from the data line $D_a$, and the data stored in the second sub-electrode control circuit after charge sharing.

Figure 5A:
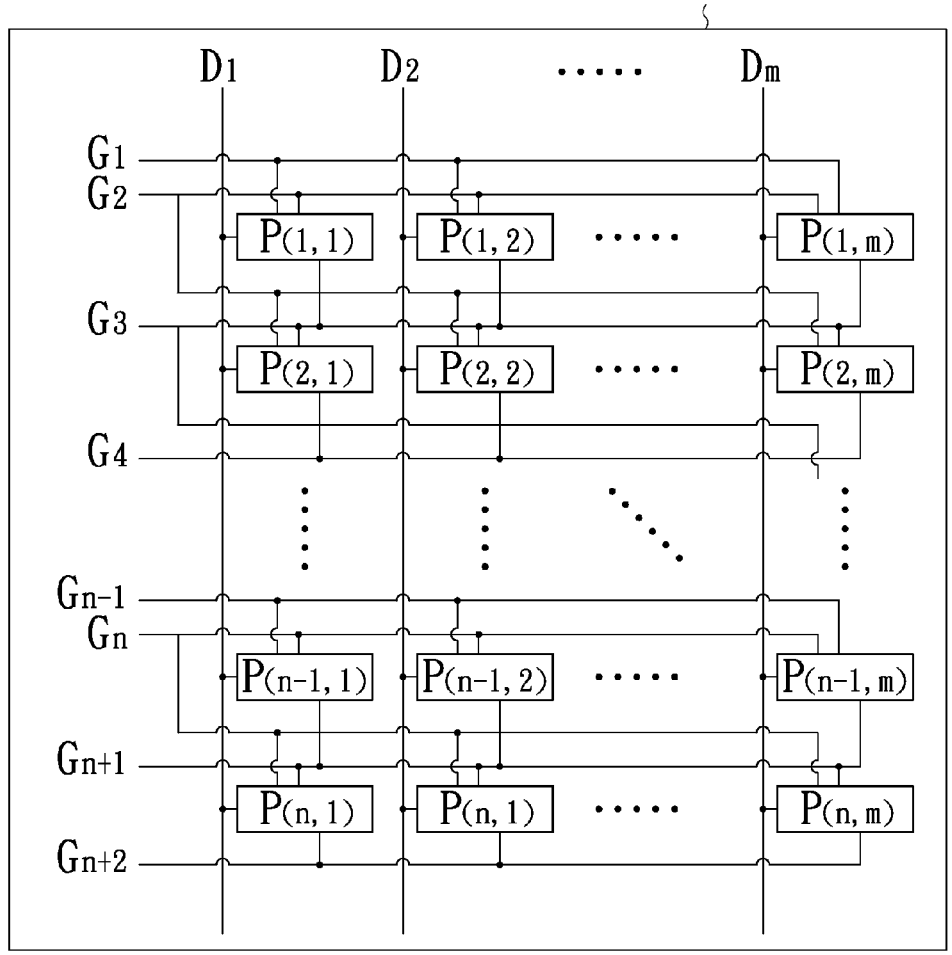
FIG. 5A is a block diagram of the display panel according to another embodiment of the present invention.

Referring to FIG. 5A, a block diagram of the display panel according to another embodiment of the present invention is shown. In the embodiment, the circuitry design is approximately similar to that of the display panel 20 shown in FIG. 2A. The difference is that, in the display panel 20 shown in FIG. 2A, the sub-pixel circuits electrically coupled to the same data line are electrically coupled to different scan lines respectively, and, in the display panel 22 shown in FIG. 5A, two adjacent sub-pixel circuits, which is electrically coupled to the same data line, have the common electrically coupled scan line.

For example, in FIG. 2A and FIG. 5A, two adjacent sub-pixel circuits $P_{(1,1)}$ and $P_{(2,1)}$ are both electrically coupled to the data line $D_1$. However, the display panel 20 shows that the sub-pixel circuit $P_{(1,1)}$ is electrically coupled to the scan lines $G_1$, $G_2$ and $G_3$, and the sub-pixel circuit $P_{(2,1)}$ is electrically coupled to the scan lines $G_4$, $G_5$ and $G_6$. Apparently, the scan lines coupled to the sub-pixel circuits $P_{(1,1)}$ and $P_{(2,1)}$ are totally different from each other in display panel 20. The display panel 22 shows that the sub-pixel circuits $P_{(1,1)}$ and $P_{(2,1)}$ are commonly electrically coupled to the scan lines $G_2$ and $G_3$ except that the sub-pixel circuit $P_{(1,1)}$ is electrically coupled to the scan line $G_1$ and the sub-pixel circuit $P_{(2,1)}$ is electrically coupled to the scan line $G_4$. Compared with the circuit in FIG. 2A, the circuitry adopted in FIG. 5A reduces a large number of the scan lines, which is much more practical.

Figure 6:
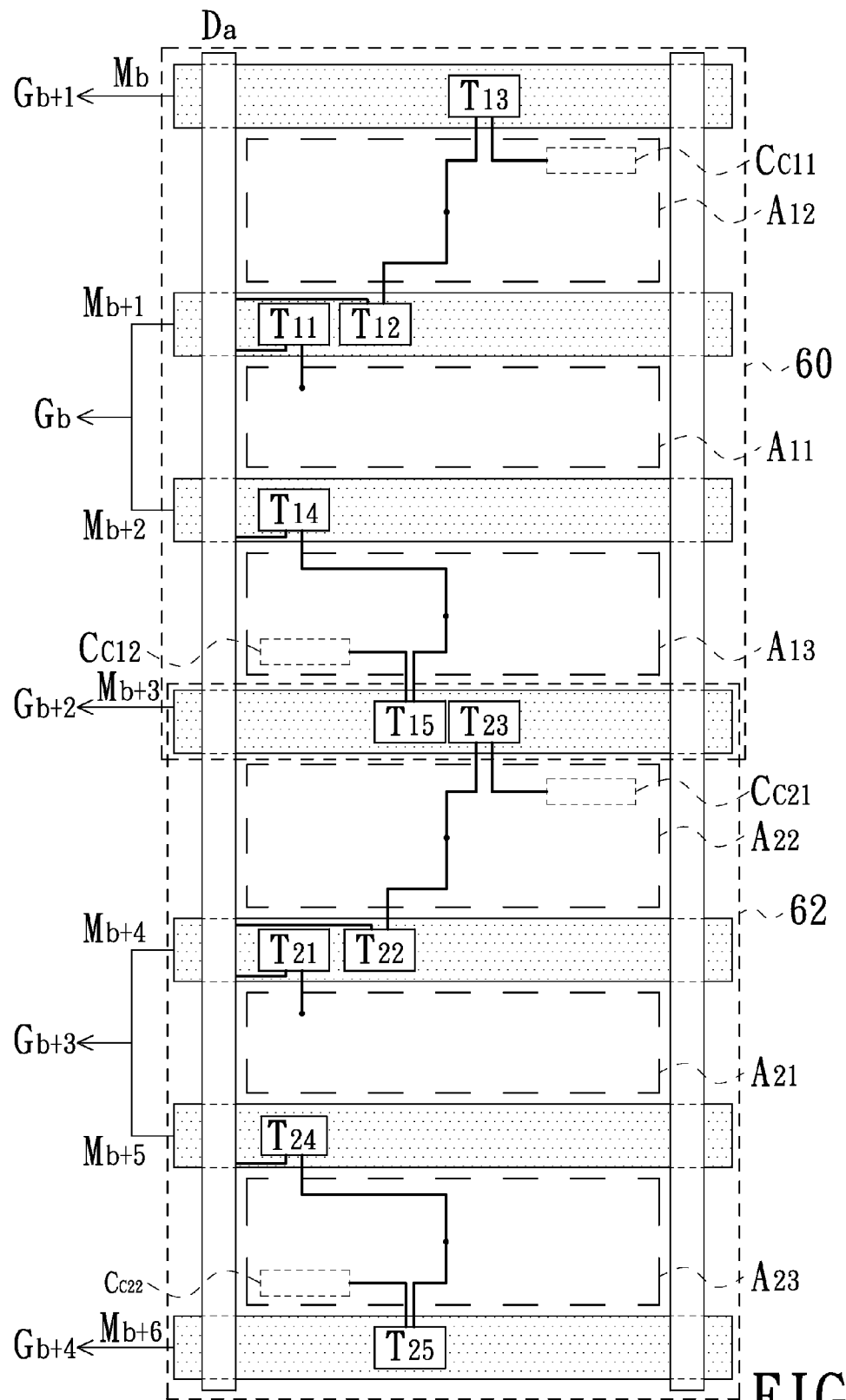
FIG. 6 is a schematic diagram of a part of the sub-pixel circuit in the display panel shown in FIG. 5A.

Referring to FIG. 6, a schematic diagram of the sub-pixel circuit applied to at least a part of the display panel illustrated in FIG. 5A is shown. The sub-pixel circuits 60 and 62 shown in FIG. 6 can be applied to the display panel shown in FIG. 2A or FIG. 5A, respectively. However, since the combination of the sub-pixel circuits 60 and 62 shown in FIG. 6 shares the same conducting line $M_{b+3}$, the circuitry shown in FIG. 6 is not suitable for the display panel 20 shown in FIG. 2A when the scan signals transmitted by the scan lines are different from each other. The scan signals are different from each other might be, for example, the timing sequences of the scan signals are different from each other, or waveforms of the scan signals are different from each other. On the contrary, in case of some scan lines transmit the same scan signal, a combination of the sub-pixel circuits 60 and 62 shown in FIG. 6 might be also applied to the display panel 20 shown in FIG. 2A.

As shown in FIG. 6, the sub-pixel circuit 60 includes three blocks $A_{11}$, $A_{12}$ and $A_{13}$, a plurality of charge sharing capacitors $C_{C11}$ and $C_{C12}$, a plurality of transistor $T_{11}$, $T_{12}$, $T_{13}$, $T_{14}$ and $T_{15}$, and a plurality of conducting lines $M_b$, $M_{b+1}$, $M_{b+2}$ and $M_{b+3}$. The sub-pixel circuit 62 includes three blocks $A_{21}$, $A_{22}$ and $A_{23}$, a plurality of charge sharing capacitors $C_{C21}$ and $C_{C22}$, a plurality of transistors $T_{21}$, $T_{22}$, $T_{23}$, $T_{24}$ and $T_{25}$, and a plurality of conducting lines $M_{b+3}$, $M_{b+4}$, $M_{b+5}$ and $M_{b+6}$. The two sub-pixel circuits 60 and 62 are both electrically coupled to the data line $D_a$. In case of the conducting lines $M_{b+1}$ and $M_{b+2}$ being electrically coupled to the scan line $G_b$, the conducting line $M_b$ would be electrically coupled to the scan line $G_{b+1}$, the conducting line $M_{b+3}$ would be electrically coupled to the scan line $G_{b+2}$, the conducting lines $M_{b+4}$ and $M_{b+5}$ would be electrically coupled to the scan line $G_{b+3}$, and the conducting line $M_{b+6}$ would be electrically coupled to the scan line $G_{b+4}$. The numeral orders of each of the conducting lines or the scan lines stand for the orders of the conducting lines or the scan lines in a certain direction. The specific circuit connections of the electronic components of each of the sub-pixel circuits are similar to those described in FIG. 4, and are not described again here.

The following is to explain a driving method being capable of driving the display panel shown in FIG. 2A or FIG. 5A by using the embodiment shown in FIG. 6. The embodiment shown in FIG. 6 cannot be applied to the display panel shown in FIG. 2A because the conducting line is shared by two sub-pixel circuits 60 and 62. When the embodiment shown in FIG. 6 is going to be applied to the display panel shown in FIG. 2A, the conducting line should be divided into two independent conducting lines so that each of the independent conducting lines is electrically coupled to one of the scan lines. That is, the scan line $G_{b+2}$ shown in FIG. 6 should correspond to the scan line $G_3$ shown in FIG. 2A while operating the sub-pixel circuit 60, and the pulse transmitted on the scan line $G_3$ is not transmitted to control the transistor $T_{23}$. Likewise, the scan line $G_{b+2}$ shown in FIG. 6 should correspond to the scan line $G_5$ shown in FIG. 2A while operating the sub-pixel circuit 62, and the pulse transmitted on the scan line $G_5$ shown in FIG. 2A is not transmitted to control the transistor $T_{15}$. Furthermore, the scan line $G_b$ shown in FIG. 6 corresponds to the scan line $G_1$ shown in FIG. 2A, the scan line $G_{b+1}$ shown in FIG. 6 corresponds to the scan line $G_2$ shown in FIG. 2A, the scan line $G_{b+3}$ shown in FIG. 6 corresponds to the scan line $G_4$ shown in FIG. 2A, and the scan line $G_{b+4}$ shown in FIG. 6 corresponds to the scan line $G_6$ shown in FIG. 2A.

In another aspect, according to the embodiment shown in FIG. 5A and FIG. 5B, the scan lines $G_b \sim G_{b+4}$ shown in FIG. 6 stated below for driving the sub-pixel circuits 60 and 62 correspond to the scan lines $G_1 \sim G_4$, shown in FIG. 5B wherein the scan line $G_b$ corresponds to the scan line $G_1$, the scan lines $G_{b+1}$ and $G_{b+3}$ corresponds to the scan line $G_2$, the scan line $G_{b+2}$ corresponds to the scan line $G_3$, and the scan line $G_{b+4}$ corresponds to the scan line $G_4$.

For driving in a sequence such that the sub-pixel circuit 62 is driven directly after the sub-pixel circuit 60 being driven, first providing only one driving signal to the sub-pixel circuit 60 to drive the sub-pixel circuit 60; afterward, providing other driving signals to respectively drive the sub-pixel circuits 60 and 62 twice; afterward, providing only one driving signal to the sub-pixel circuit 62 to drive the sub-pixel circuits 62. For driving in a sequence such that the sub-pixel circuit 60 is driven directly after the sub-pixel circuit 62 being driven, first providing only one driving signal to the sub-pixel circuit 62 to drive the sub-pixel circuits 62; afterward, providing other driving signals to respectively drive the sub-pixel circuits 60 and 62 twice; afterward, providing only one driving signal to the sub-pixel circuit 60 to drive the sub-pixel circuit 60.

In detail, in the event of driving the sub-pixel circuit 60 followed by driving sub-pixel circuit 62, i.e., forward driving, a pulse (hereinafter a first signal) would be provided to the scan line $G_b$, and the first signal is transmitted to the conducting lines $M_{b+1}$ and $M_{b+2}$ of the sub-pixel circuit 60 through the scan line $G_b$ for acting as a first scan signal of the sub-pixel circuit 60. Then, another pulse (hereinafter a second signal) is provided to the scan lines $G_{b+1}$ and $G_{b+3}$. The second signal is respectively transmitted to $M_b$, $M_{b+4}$ and $M_{b+5}$ through the scan lines $G_{b+1}$ and $G_{b+3}$ for acting as a second scan signal of the sub-pixel circuit 60 and a first scan signal of the sub-pixel circuits 62, respectively.

After the second signal, one pulse (hereinafter a third signal) is provided to the scan line $G_{b+2}$. The third signal is transmitted to the conducting line $M_{b+3}$ through the scan line $G_b$ for acting as a third scan signal of the sub-pixel circuit 60 and a second scan signal of the sub-pixel circuit 62. Finally, another pulse (hereinafter a fourth signal) is provided to the scan line $G_{b+4}$, and is transmitted to the conducting line $M_{b+4}$ through the scan line $G_{b+4}$ for acting as a third scan signal of the sub-pixel circuit 62.

Refer to FIG. 6, FIG. 2A and FIG. 2B together, while operating the display panel 20 shown in FIG. 2A with the timing diagram shown in FIG. 2B, the first signal stated above might be the pulse 201. In this situation, the second signal should include two pulses 202 and 204, wherein the pulse 202 is transmitted to the sub-pixel circuit 60 for acting as the second scan signal of the sub-pixel circuit 60, and the pulse 204 is transmitted to the sub-pixel circuit 62 for acting as the first scan signal of the sub-pixel circuit 62. Likewise, in this situation, the third signal should include two pulses 203 and 205, wherein the pulse 203 is transmitted to the sub-pixel circuit 60 for acting as the third scan signal of the sub-pixel circuit 60, and the pulse 205 is transmitted to the sub-pixel circuit 62 for acting as the second scan signal of the sub-pixel circuit 62. The fourth signal should be the pulse 206 and is transmitted to the sub-pixel circuit 62 for acting as the third scan signal of the sub-pixel circuit 62 in this situation.

Figure 5B:
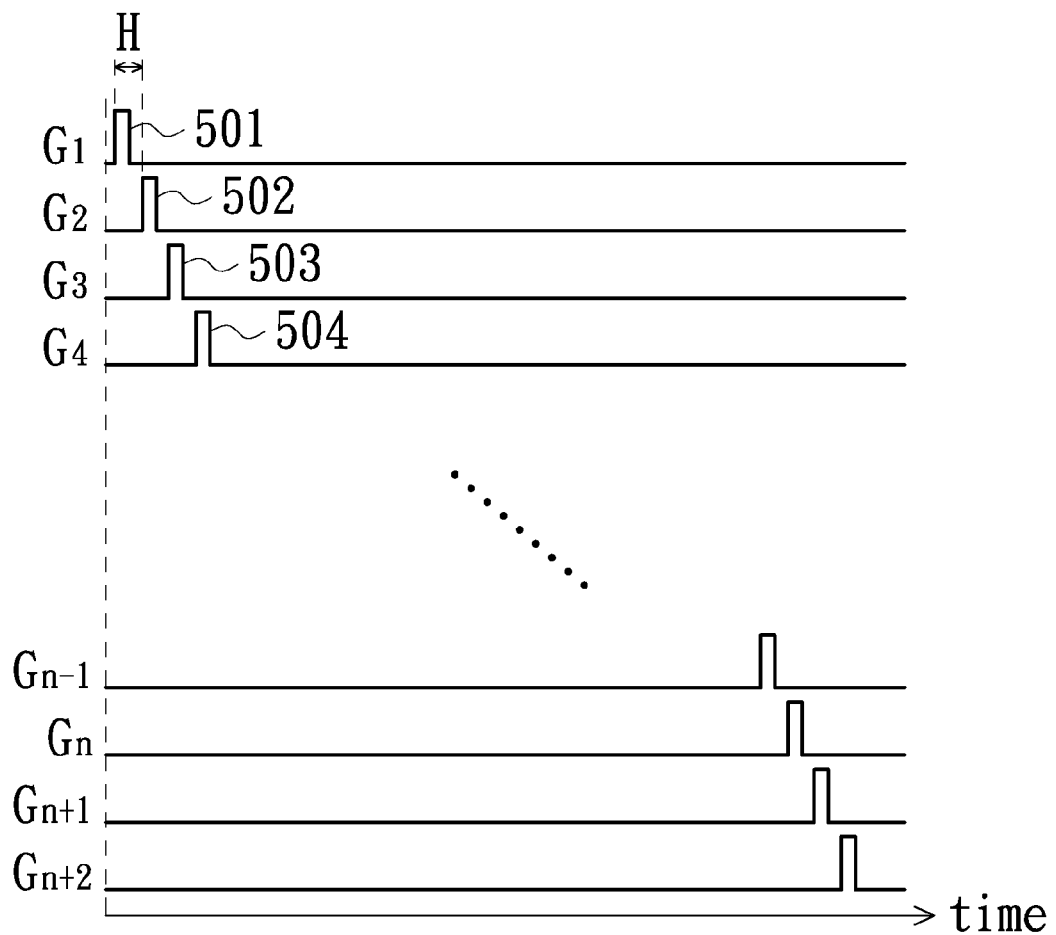
FIG. 5B is a timing diagram of the scan signals transmitted on the scan lines of the display panel according to FIG. 5A.

Refer to FIG. 6, FIG. 5A and FIG. 5B together, while operating the display panel 22 shown in FIG. 5A with the timing diagram shown in FIG. 5B, the first signal stated above might be the pulse 501. In this situation, the second signal should be pulse 502, the third signal should be pulse 503, and the fourth signal should be the pulse 504.

In case of driving in a reverse order, that is, in the event of driving the sub-pixel circuits 62 followed by driving sub-pixel circuit 60, a pulse (hereinafter a fifth signal) would be provided to the scan line $G_{b+3}$, and the fifth signal is transmitted to the conducting lines $M_{b+4}$ and $M_{b+5}$ of the sub-pixel circuit 62 through the scan line $G_{b+3}$ for acting as a first scan signal of the sub-pixel circuit 62. Then, another pulse (hereinafter a sixth signal) is provided to the scan lines $G_b$ and $G_{b+4}$, and is transmitted to the conducting line $M_{b+1}$, $M_{b+2}$ and $M_{b+6}$ through the scan lines $G_b$ and $G_{b+4}$ for acting as a first scan signal of the sub-pixel circuit 60 and a second scan signal of the sub-pixel circuit 62, respectively.

After the sixth signal, one pulse (hereinafter a seventh signal) is provided to the scan line $G_{b+2}$. The seventh signal is transmitted to the conducting line $M_{b+3}$ through the scan lines $G_{b+2}$ for acting as a second scan signal of the sub-pixel circuit 60 and a third scan signal of the sub-pixel circuits 62. Finally, another pulse (hereinafter an eighth signal) is provided to the scan line $G_{b+1}$ and transmitted to the conducting line $M_b$ through the scan lines $G_{b+1}$ for acting as a third scan signal of the sub-pixel circuit 60.

Since the sub-pixel circuits in FIG. 5A share some of the scan lines, the time interval between two successive pulses, such as pulses 501 and 502 in FIG. 5B should be the time for a horizontal line (one H). On the contrary, since the sub-pixel circuits in FIG. 2A do not share any of the scan lines, the time interval between successive pulses controlling the same sub-pixel, such as the time interval $t_1$ or $t_2$, are not constrained to the time for a horizontal line (one H). Actually, the time interval $t_1$ or $t_2$ might be one H, two H, three H . . . , etc. Moreover, as shown in FIG. 2B, the time interval between two successive pulses in the group consists of pulses transmitted on the scan lines $G_1, G_4, \ldots, G_{3n-5}$ and $G_{3n-2}$ is one H because each of these pulses performs the same control function for one corresponding sub-pixel circuit. Likewise, the time interval between two successive pulses in the group consists of pulses transmitted on the scan lines $G_2, G_5, \ldots, G_{3n-4}$ and $G_{3n-1}$, and the time interval between two successive pulses in the group consists of pulses transmitted on the scan lines $G_3, G_6, \ldots, G_{3n-3}$ and $G_{3n}$ is one H.

Furthermore, since the scan lines $G_2, G_3, \ldots$, etc. in FIG. 5A are shared by two sub-pixel circuits, the two neighboring sub pixel circuits coupling to the same data line are driven simultaneously when these scan lines transmit corresponding pulses. For display panel 20 in FIG. 2A, although the scan lines are not shared by the sub-pixels coupling to the same data line, the timing of the pulses for two successively driven sub-pixels can be adjusted such that the two successively driven sub-pixels are driven simultaneously. For example, pulses 202 and 204 might be adjusted such that pulses 202 and 204 are transmitted and simultaneously drive the corresponding sub-pixel circuits.

The above-mentioned scan signal providing order could be achieved by matching shift registers in a gate driver circuit in a specific connection-order. Besides, the scan lines for transmitting the same driver signal could be electrically coupled to the same shift register, or, in another design, could be electrically coupled to different shift registers. Different designs can be adjusted according to what the circuitry and display panel needs. Those adjustments can be accomplished by those skilled in the art referring to the descriptions in above embodiments, and are not described in detail here.

Besides Vertical Alignment (VA) mode LCD, in case of applying these embodiments to Multi-domain Vertical Alignment (MVA) mode LCD, a side-view optical performance of 12 areas (4 areas*3 blocks) could be presented in a 2D display mode.

To sum up, the present invention adopts three scan lines for completing display-control of a sub-pixel so that the sub-pixel may have three different degrees of the brightness and improve color washout phenomenon. Accordingly, the present invention is quite suitable for actual use in the products.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A sub-pixel circuit, electrically coupled to one data line of a display device, comprising:
   a first sub-electrode control circuit, electrically coupled to the one data line and controlled by first scan signal for determining the transmittance of a first block;
   a second sub-electrode control circuit, electrically coupled to the one data line and controlled by the first scan signal and a second scan signal for determining the transmittance of a second block;
   a third sub-electrode control circuit, electrically coupled to the one data line and controlled by the first scan signal and a third scan signal for determining the transmittance of a third block; a plurality of charge sharing capacitors;
   a first scan line for transmitting the first scan signal, a second scan line for transmitting the second signal and a third scan line for transmitting the third scan signals,
   wherein the first, the second, and the third scan signals are different from each other; wherein the first block, the second block and the third block are independent and different from each other.

2. The sub-pixel circuit according to claim 1, wherein the first sub-electrode control circuit comprises:
   a switch component;
   a sub-electrode electrically coupled to the switch component; and
   a storage capacitor,
   wherein the switch component is electrically coupled between the data line and the storage capacitor, and the switch component is controlled by the first scan signal for determining whether to transmit the data transmitted by the data line to the storage capacitor.

3. The sub-pixel circuit according to claim 2, wherein the second sub-electrode control circuit comprises:
   a first switch component;
   a second switch component;
   a sub-electrode electrically coupled to the first switch component and the second switch component;
   a storage capacitor; and
   a charge sharing capacitor,
   wherein the first switch component is electrically coupled between the data line and the storage capacitor of the second sub-electrode control circuit, the second switch component is electrically coupled between the storage capacitor of the second sub-electrode control circuit and the charge sharing capacitor, the first switch component is controlled by the first scan signal for determining whether to transmit the data transmitted by the data line to the storage capacitor, and the second switch component is controlled by the second scan signal for determining whether to conduct an electric path between the storage capacitor and the charge sharing capacitor.

4. The sub-pixel circuit according to claim 3, wherein the third sub-electrode control circuit comprises:
   a first switch component;
   a second switch component;
   a sub-electrode electrically coupled to the first switch component and the second switch component;
   a storage capacitor; and
   a charge sharing capacitor,
   wherein the first switch component of the third sub-electrode control circuit is electrically coupled between the data line and the storage capacitor of the third sub-electrode control circuit, the second switch component of the third sub-electrode control circuit is electrically coupled between the storage capacitor of the third sub-electrode control circuit and the charge sharing capacitor of the third sub-electrode control circuit, the first switch component of the third sub-electrode control circuit is controlled by the first scan signal for determining whether to transmit the data transmitted by the data line to the storage capacitor of the third sub-electrode control circuit, and the second switch component of the third sub-electrode control circuit is controlled by the third scan signal for determining whether to conduct an electric path between the storage capacitor of the third sub-electrode control circuit and the charge sharing capacitor of the third sub-electrode control circuit.

5. The sub-pixel circuit according to claim 4, wherein the first switch components of the first, second and third sub-electrode control circuits and the second switch components of the second and third sub-electrode control circuits are independent and different components.

6. The sub-pixel circuit according to claim 1, wherein the second and the third blocks are disposed on the two opposite sides of the first block, the sub-pixel circuit further comprising a plurality of conducting lines for transmitting the first scan signal, the second scan signal and the third scan signal, wherein some of the conducting lines for transmitting the first scan signal are disposed between the first and the second blocks while the other of the conducting lines for transmitting the first scan signal are disposed between the first and the third blocks.

7. The sub-pixel circuit according to claim 1, wherein the first, second and third sub-electrode control circuits are independent and different circuits.

8. A display panel, comprising:
   a plurality of data lines;
   a plurality of scan lines;
   a plurality of blocks; and
   a plurality of sub-pixel circuits, wherein at least one of the sub-pixel circuits is configured to control some of the blocks, and is electrically coupled to one of the data lines, a first scan line of the scan lines, a second scan line of the scan lines and a third scan line of the scan lines, the at least one of the sub-pixel circuits comprising:
   a first sub-electrode control circuit, electrically coupled to the one of the data lines and controlled by a first scan signal for determining the transmittance of a first block of the plurality of blocks;
   a second sub-electrode control circuit, electrically coupled to one of the data lines and controlled by the first scan signal and a second scan signal for determining the transmittance of a second block of the plurality of blocks;
   a third sub-electrode control circuit, electrically coupled to the one of the data lines and controlled by the first scan signal and a third scan signal for determining the transmittance of a third block of the plurality of blocks;
   a plurality of charge sharing capacitors;
   wherein the first scan line transmits the first scan signal, the second scan line transmits the second signal and the third scan line transmits the third scan signals, and the first, the second, and the third scan signals are different from each other.

9. The display panel according to claim 8, wherein the first sub-electrode control circuit comprises:
   a switch component;
   a sub-electrode electrically coupled to the switch component; and
   a storage capacitor,
   wherein the switch component electrically coupled to the storage capacitor and controlled by the first scan signal for determining whether to transmit the data from the coupled data line to the storage capacitor.

10. The display panel according to claim 9, wherein the second sub-electrode control circuit comprises:
    a first switch component;
    a second switch component;
    a sub-electrode electrically coupled to the first and the second switch components;
    a storage capacitor; and
    a charge sharing capacitor,
    wherein the first switch component is electrically coupled to the storage capacitor, and the second switch component is electrically coupled between the storage capacitor and the charge sharing capacitor, wherein the first switch component is controlled by the first scan signal for determining whether to transmit the data transmitted by the data line to the storage capacitor, and the second switch component is controlled by the third scan signal for determining whether to conduct an electric path between the storage capacitor and the charge sharing capacitor.

11. The display panel according to claim 10, wherein the third sub-electrode control circuit comprises:
    a first switch component;
    a second switch component;
    a sub-electrode electrically coupled to the first and the second switch components;
    a storage capacitor; and
    a charge sharing capacitor,
    wherein the first switch component is electrically coupled to the storage capacitor, and the second switch component is electrically coupled between the storage capacitor and the charge sharing capacitor, wherein the first switch component is controlled by the first scan signal for determining whether to transmit the data transmitted by the data line to the storage capacitor, and the second switch component is controlled by the third scan signal for determining whether to conduct an electric path between the storage capacitor and the charge sharing capacitor.

12. A driving method, applicable for driving the display panel as claimed in claim 11 in a first direction, the method comprising:
    transmitting the first scan signal to turn on the switch of the first sub-electrode control circuit, the first switch of the second sub-electrode control circuit and the first switch of the third sub-electrode control circuit simultaneously;
    transmitting the second scan signal to turn on the second switch of the second sub-electrode control circuit; and
    transmitting the third scan signal to turn on the second switch of the third sub-electrode control circuit.

13. The display panel according to claim 8, wherein the sub-pixel circuits electrically coupled to the same data line do not couple to the same scan line.

* * * * *